United States Patent [19]

Boswell

[11] 4,422,825

[45] Dec. 27, 1983

[54] CONTROLLED WIND MOTOR

[76] Inventor: Fred A. Boswell, Box 440, Ft. Valley Rte., Strasburg, Va. 22657

[21] Appl. No.: 370,627

[22] Filed: Apr. 22, 1982

Related U.S. Application Data

[63] Continuation-in-part of Ser. No. 131,666, Apr. 29, 1980, abandoned.

[51] Int. Cl.³ .............................................. F03D 7/06
[52] U.S. Cl. ............................... 416/132 B; 416/119; 416/227 A
[58] Field of Search ............... 416/132 B, 119, 227 A, 416/197 A, DIG. 8, 89 A

[56] References Cited

U.S. PATENT DOCUMENTS

| | | | |
|---|---|---|---|
| 1,835,018 | 12/1931 | Darrieus | 416/DIG. 8 X |
| 3,918,839 | 11/1975 | Blackwell et al. | 416/175 A |
| 4,082,479 | 4/1978 | Rangi et al. | 416/23 |
| 4,142,822 | 3/1979 | Herbert et al. | 415/2 |
| 4,264,279 | 4/1981 | Dereng | 416/227 A |
| 4,281,965 | 8/1981 | Stjernholm | 416/227 A |

FOREIGN PATENT DOCUMENTS

| | | | |
|---|---|---|---|
| 2298707 | 8/1976 | France | 416/132 B |
| 7606729 | 12/1977 | Netherlands | 416/227 A |

*Primary Examiner*—Everette A. Powell, Jr.

*Attorney, Agent, or Firm*—Shlesinger, Arkwright, Garvey & Fado

[57] ABSTRACT

A mechanical sail including a rotatable mast, the mast including a top vane mount and a bottom vane mount, the mounts being spaced from each other on the mast and rotatable therewith, a series of rotatable vanes spaced from and surrounding the mast and supported by and between the mounts, cam operators extending between the mounts and connected to the vanes for controlling the rotation of the vanes, a first controller associated with the mast below the bottom vane mount for controlling the cam operators, the first controller being movable vertically with respect to the mast, a second controller for moving the first controller vertically with respect to the mast, the vanes being flexible and bowed outwardly, the bottom vane mount being movable with respect to the mast and connected to the second controller whereby when the second controller is operated, the bottom vane mount will move toward the top vane mount causing the vanes to bow outwardly at a desired arc and whereby when the first controller is moved, the vanes are caused to rotate to the desired angle of attack with respect to wind velocity and direction. When the sail is connected to a motor drive, the vessel may be driven forward or rearward depending on the angle of attack of the vanes through 180°.

7 Claims, 15 Drawing Figures

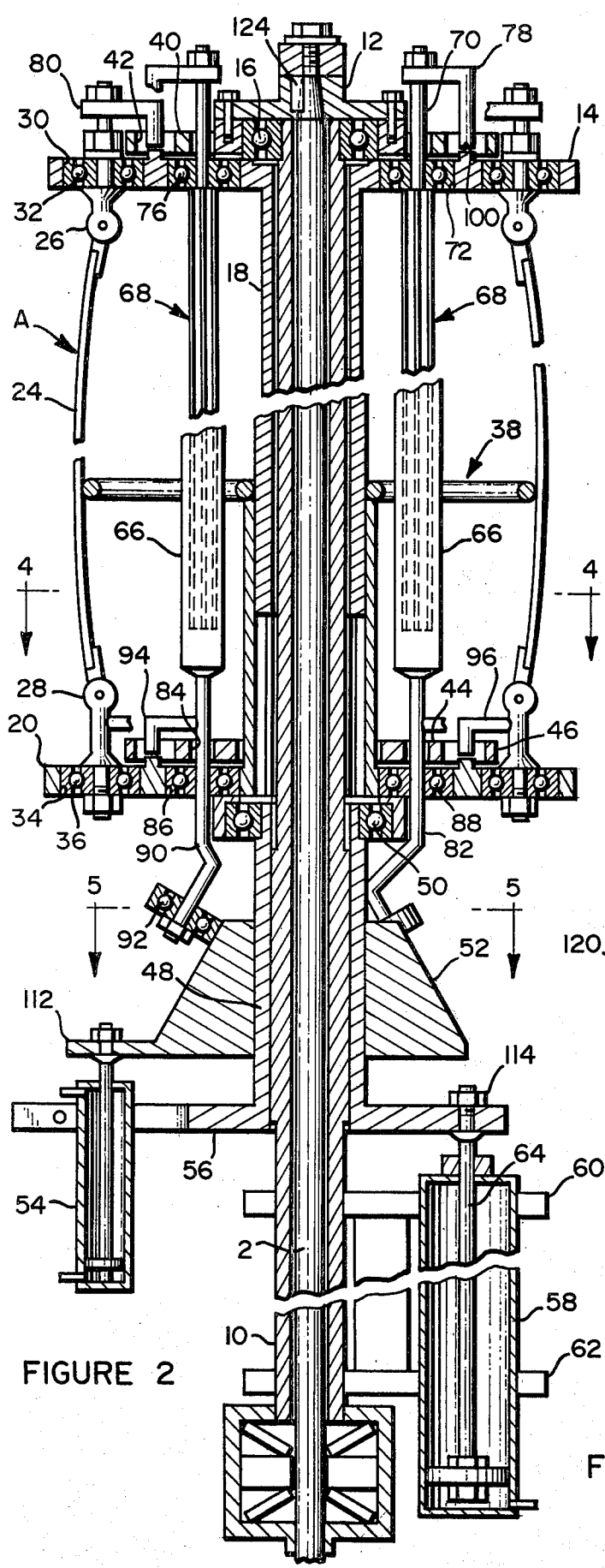
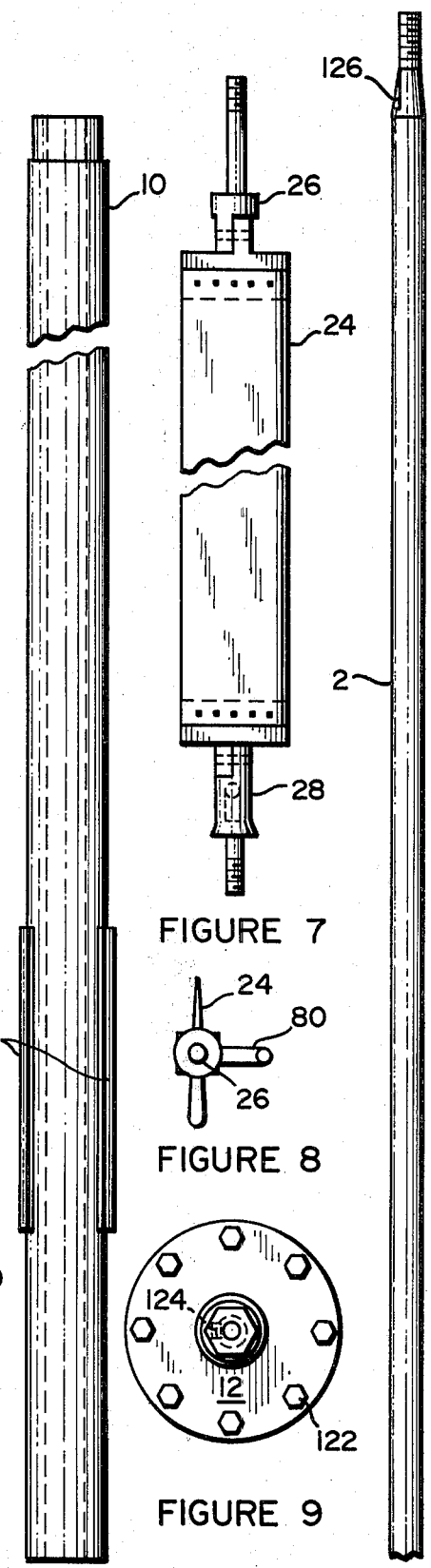
FIGURE 2
FIGURE 6
FIGURE 7
FIGURE 8
FIGURE 9
FIGURE 10

4,422,825

CONTROLLED WIND MOTOR

This application is a continuation-in-part of application Ser. No. 131,666 filed Apr. 29, 1980, now abandoned.

FIELD OF THE INVENTION

This invention relates to mechanical sails and more particularly to mechanical sails having a plurality of flexible vanes which are controlled in a manner so as to cause the vanes to bow outwardly at a desired arc as well as to cause the vanes to be rotated to a desired pitch with respect to wind direction and velocity.

HISTORICAL BACKGROUND

Apparatus for utilizing wind as a source of power in order to rotate a shaft having a plurality of vanes mounted therearound have been known for some time. Darrieus U.S. Pat. No. 1,835,018 discloses such apparatus. Further modifications of this basic design are taught by Blackwell in U.S. Pat. No. 3,918,839, Rangi U.S. Pat. No. 4,082,479, Dereng U.S. Pat. No. 4,264,279 and Stjernholm U.S. Pat. No. 4,281,965.

None of the above references discloses means for altering the aerodynamic configuration of the vanes during actual usage with respect to arcuate bowing of the vanes as well as with respect to the rotational pitch of the vanes. Netherland Pat. 7606729 which issued Dec. 23, 1977, discloses a wind turbine in which the vanes may be bowed outwardly, however it does not teach the use of controlling means for altering the pitch of the individual vanes. In addition, the above references do not disclose the use of an auxiliary motor which drives the wind turbine for the purpose of propelling a ship.

SUMMARY AND OBJECTS OF THE INVENTION

The deficiencies of the prior art are overcome by the present invention which provides a mechanical sail having a plurality of flexible vanes whose aerodynamic properties may be altered so as to provide enhanced versatility during use regardless of changing wind conditions. This is accomplished by means of two separate piston operator means, the first of which causes rotation of the vanes to compensate for changing wind direction while the second operator causes the vanes to bow outwardly to compensate for changing wind velocity.

This apparatus may be adapted for use with boats in order to propel the same. It is therefore an object of the present invention to provide a mechanical sail having a plurality of flexible vanes which utilizes operator means for controlling both the rotational pitch of the vanes as well as the outward bow of the vanes.

It is another object of the present invention to provide a mechanical sail which may be adapted for use with boats in order to propel the same.

It is a further object of the present invention to provide a mechanical sail whose vanes may be altered while the apparatus is in operation.

A further object of the present invention is to provide a mechanical sail which may be connected to a motor in order to provide auxiliary power.

A still further object of the present invention is to provide a mechanical sail which is inexpensive to manufacture.

A further object of the present invention is to provide a mechanical sail having enhanced versatility in changing wind conditions.

A still further object of the present invention is to provide a mechanical sail which is simple in design.

The foregoing and other objects and advantages of this invention will appear from the following detailed description, taken in connection with the accompanying drawings.

DESCRIPTION OF THE DRAWINGS

FIG. 2 is a sectional view taken substantially along line 2—2 of FIG. 1 and viewed in the direction of the arrows;

FIG. 6 is a side elevational view of the sleeve shown in FIG. 2;

FIG. 7 is a side elevational view showing one of the vanes of FIG. 2;

FIG. 8 is a top plan view of a cam member connected to a vane;

FIG. 9 is a top plan view of the power transmitting element of FIG. 2;

FIG. 10 is a side elevational view of the drive shaft of FIG. 2;

DETAILED DESCRIPTION OF THE INVENTION

FIGS. 1 AND 2

Figure 1:
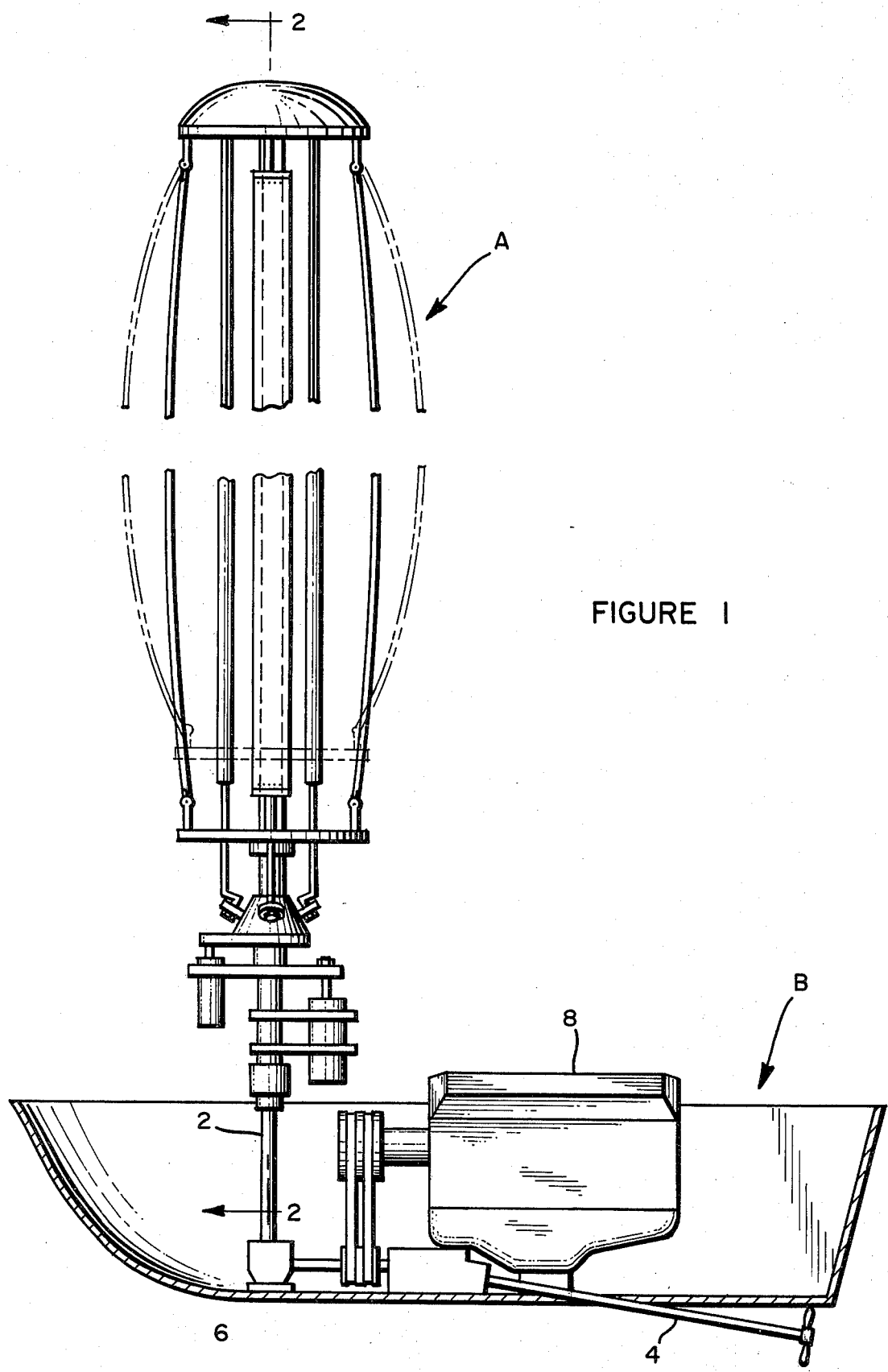
FIG. 1 is a diagrammatic view of the mechanical sail mounted in a boat and connected to an auxiliary motor and propeller.

FIG. 1 shows the mechanical sail A including drive shaft 2 mounted in a boat B and connected to a propeller drive shaft 4 through a transmission 6. An auxiliary motor 8 is connected to propeller drive shaft 4.

In FIG. 2, mechanical sail A is shown in detail. Mechanical sail A includes a mast comprising rotatable drive shaft 2 and nonrotatable sleeve 10 which surrounds drive shaft 2. The uppermost portion of drive shaft 2 is keyed to power transmitting plate 12. Bolted to power transmitting plate 12 is top vane mount 14. Bearing assembly 16 allows rotation of top vane mount 14 around sleeve 10. Top vane mount 14 includes downwardly extending sleeve portion 18.

Located beneath top vane mount 14 is a bottom vane mount 20 including an upwardly extending sleeve portion 22 which telescopically receives downwardly extending sleeve portion 18 and is keyed thereto so as to rotate with top vane mount 14 around sleeve 10. A series of flexible rotatable vanes 24, spaced from and circumferentially surrounding the mast, are connected to and supported between mounts 14,20. Vanes 24 are connected at their distal ends to hinged vane supports 26,28.

Vane supports 26 are positioned within holes 30 formed in top vane mount 14 and are surrounded by bearing assemblies 32. Likewise, vane supports 28 are positioned within holes 34 formed in bottom vane mount 20 and are surrounded by bearing assemblies 36. A vane retention ring 38 is mounted on the upper portion of upwardly extending sleeve portion 22 and prevents inward deflection of vanes 24.

Auxiliary plate 40 having a plurality of slots 42 is mounted on top of top vane mount 14. Likewise, auxiliary plate 44 having a plurality of slots 46 is mounted on top of bottom vane mount 20.

A second nonrotatable sleeve 48 surrounds nonrotatable sleeve 10 below bottom vane mount 20. A bearing assembly 50 surrounds the uppermost portion of sleeve 48. Bottom vane mount 20 rests upon bearing assembly 50 for rotation about sleeve 48. A nonrotatable conically shaped cam follower 52 is positioned around sleeve 48 below bearing assembly 50. A first piston operator means 54 is mounted within plate 56 which is an extension of the lowermost portion of sleeve 48. First piston operator means 54 is connected to cam follower 52 to cause vertical movement of cam follower 52 along sleeve 48.

A second piston operator means 58 is mounted by supporting brackets 60,62 to the lowermost portion of sleeve 10. A piston rod 64 connects second piston operator means 58 to plate 56.

When second piston operator means 48 is activated, sleeve 48 will move vertically along sleeve 10 causing bottom vane mount 20 to move toward or away from top vane mount 14, thereby causing vanes 24 to be bowed outwardly to a varying extent.

In order to vary the pitch of the vanes, mechanical sail A is provided with telescopic sleeve members 66 and sleeve cooperating members 68. Sleeve cooperating members 68 include vertical extensions 70 which pass through openings 72,74 formed in top vane mount 14 and auxiliary plate 40 respectively. Bearing assemblies 76 are positioned within openings 72 and surround vertical extensions 70. Cam members 78 extend from vertical extensions 70 and are received in slots 42 of auxiliary plate 40.

Sleeve cooperating members 68 are received telescopically within sleeve members 66 and in addition are keyed to sleeve members 66 so as to rotate therewith. Sleeve members 66 include downwardly projecting vertical extensions 82 which pass through openings 84,86 which are formed in auxiliary plate 44 and bottom vane mount 20 respectively. Vertical extensions 82 are surrounded by bearing assemblies 88 which are mounted within openings 86 in bottom vane mount 20. Cams are formed at the lowermost portion of vertical extensions 82 and include bearing assemblies 92 which ride on cam follower 52. Vertical extensions 82 include cams 94 which extend therefrom and are received in slots 46 within auxiliary plate 44. Likewise, hinged vane supports 28 include cams 96 extending therefrom and received within slots 46.

When first piston operator means 54 is activated, cam follower 52 is moved vertically along sleeve 48 causing cams 90 to rotate. As cams 90 rotate, telescopic sleeve members 66 and sleeve cooperating members 68 likewise rotate. This in turn causes cams 94,96 to rotate thereby altering the rotational pitch of vanes 24.

FIGS. 3 THROUGH 5

Figure 3:
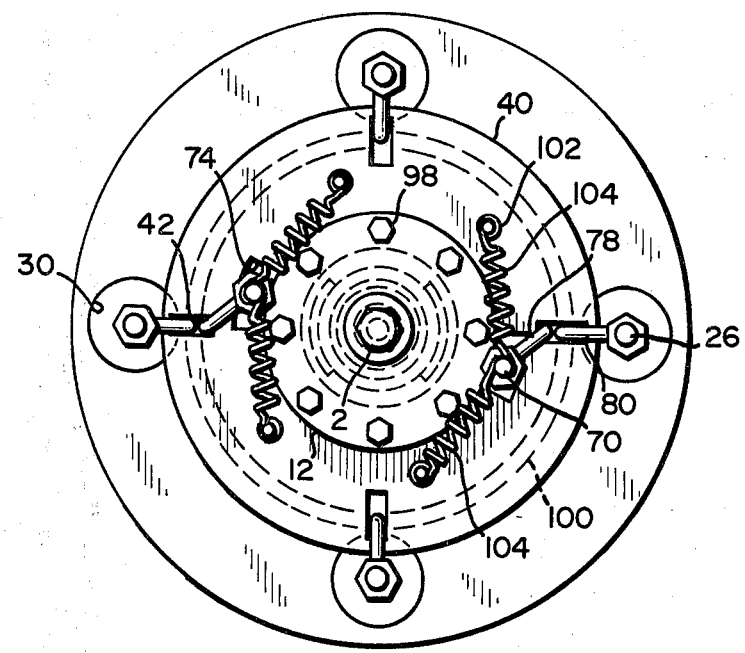
FIG. 3 is a top plan view of FIG. 2 with portions shown in dotted lines.

Referring now to FIG. 3, top vane mount 14 is secured to power transmitting plate 12 by a plurality of bolts 98 while power transmitting plate 12 is secured to drive shaft 2. Mounted upon a flange 100 of top vane mount 14 is auxiliary plate 40 having a plurality of slots 42. Cam member 80 of hinged vane support 26 and cam member 78 of vertical extension 70 both extend into slots 42. Also shown are studs 102 projecting from auxiliary plate 40 and springs 104 which are connected to studs 102 at one end thereof and to vertical extensions 70 at the other end thereof. Springs 104 help to control vibrational forces as well as to provide tension for maintaining cams 90 in contact with cam follower 52.

Figure 4:
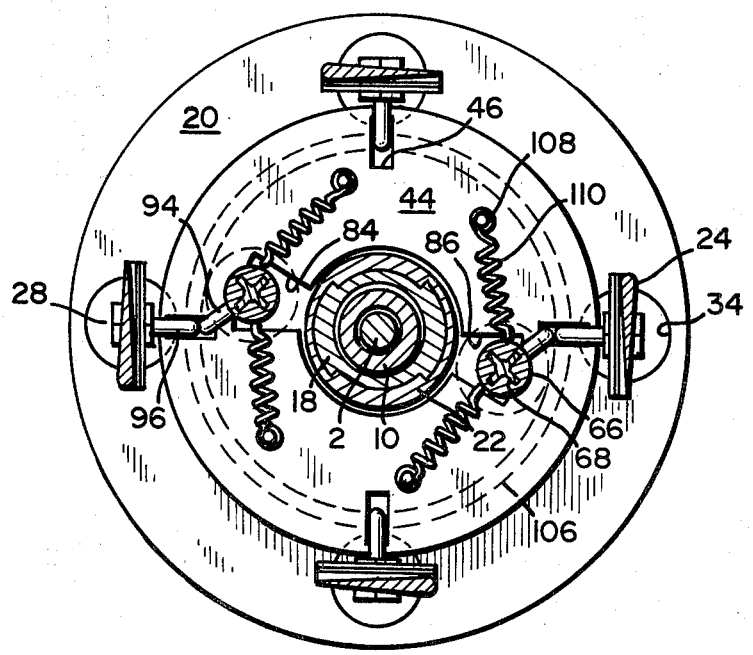
FIG. 4 is a cross-sectional view taken along line 4—4 of FIG. 2 and viewed in the direction of the arrows.

Referring now to FIG. 4, drive shaft 2 is surrounded by nonrotatable sleeve 10. Surrounding nonrotatable sleeve 10 is downwardly extending sleeve portion 18 which is surrounded by and telescopically received in upwardly extending sleeve portion 22. Mounted around upwardly extending sleeve portion 22 is bottom vane mount 20 with upwardly extending flange 106. Mounted upon flange 106 is auxiliary plate 44 having slots 46 therein. A plurality of vanes 24 are connected at their lower ends to hinged vane supports 28 which are positioned within holes 34 within bottom vane mount 20.

Sleeve cooperating members 68 are positioned within telescopic sleeve members 66. Cams 94 extend from vertical extensions 82 (not shown), and are received in slots 46. Cams 96 extend from hinged vane supports 28 and likewise are received in slots 46. A plurality of studs 108 extend upwardly from auxiliary plate 44. Springs 110 are connected at one end thereof to studs 108 and at the other end thereof to vertical extensions 82 (not shown). Springs 110 operate in the same fashion as springs 104 of FIG. 3.

Figure 5:
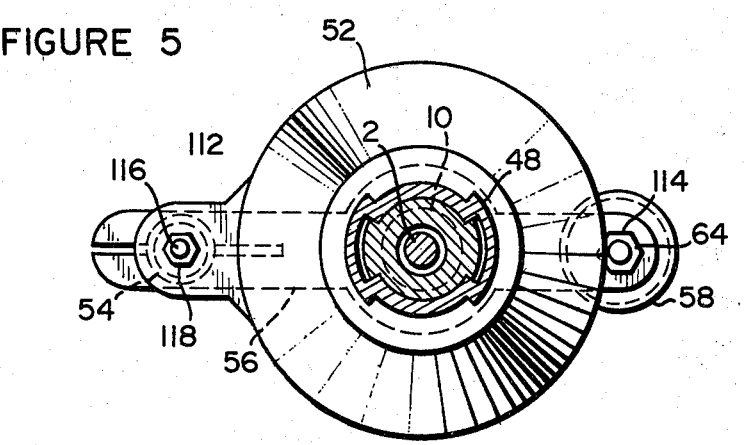
FIG. 5 is a cross-sectional view taken along line 5—5 of FIG. 2 and viewed in the direction of the arrows.

Referring now to FIG. 5, drive shaft 2 is surrounded by nonrotatable sleeve 10. Surrounding nonrotatable sleeve 10 and keyed thereto is second nonrotatable sleeve 48. Surrounding second nonrotatable sleeve 48 is cam follower 52 including outwardly extending mounting flange 112. Extending from the lowermost portion of second nonrotatable sleeve 48 is plate 56.

Secured to the right-hand side of plate 56 by a nut 114 is piston rod 64 of second piston operator means 58. Mounted to plate 56 on the left-hand side thereof is first piston operator means 54. Extending from first piston operator means 54 is piston rod 116 which is secured to mounting flange 112 by nut 118.

FIGS. 6 THROUGH 11

FIG. 6 shows nonrotatable sleeve 10 having projecting keys 120 for reception into corresponding slots formed in second nonrotatable sleeve 48 (not shown).

FIG. 7 shows a vane 24 having airfoil configuration and including hinged vane support 26 connected at the top thereof and hinged vane support 28 connected at the bottom thereof.

FIG. 8 shows cam member 80 attached to hinged vane support 26 of vane 24.

FIG. 9 shows power transmitting plate 12 including a plurality of holes 122 for receiving a plurality of bolts 98 (not shown). Power transmitting plate 12 includes key 124 for reception within a corresponding slot formed in drive shaft 2.

FIG. 10 shows drive shaft 2 including slot 126 for reception of key 124 of power transmitting plate 12.

Figure 11:
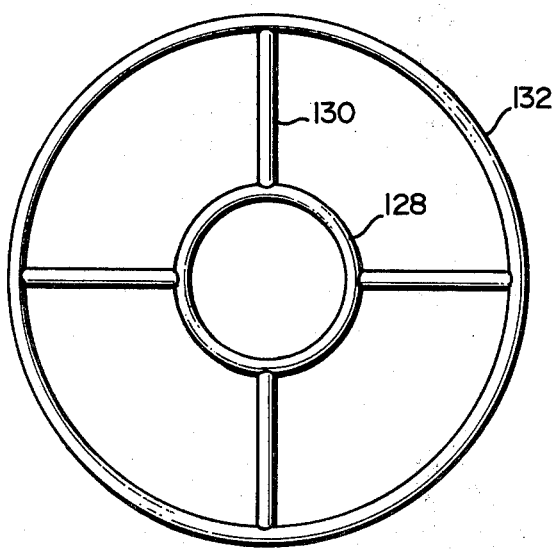
FIG. 11 is a top plan view of the vane retention ring of FIG. 2.

FIG. 11 shows vane retention ring 38 including inner ring 128 which is mounted upon upward extending sleeve portion 22 (not shown). Extending radially from inner ring 128 are spokes 130. Outer ring 132 is secured to the distal ends of spokes 130. Outer ring 132 remains in contact with vanes 24 so as to prevent vanes 24 from bowing inwardly.

FIGS. 12 THROUGH 15

Figures 12, 13:
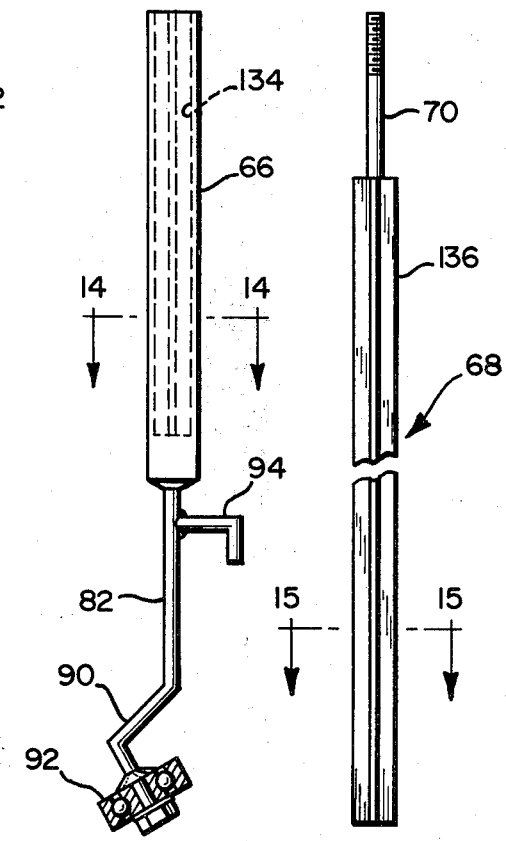
FIG. 12 is a side elevational view of the telescopic sleeve member with its associated cam member as shown in FIG. 2.
FIG. 13 is a side elevational view of the connecting rod member which fits into the telescopic sleeve member of FIG. 12.
Figure 14:
FIG. 14 is a cross-sectional view taken along line 14—14 of FIG. 12 and viewed in the direction of the arrows.

FIGS. 12 and 14 show telescopic sleeve member 66 having slots 134 formed therein. Vertical extension 82 is connected to the lowermost portion of telescopic sleeve member 66 and includes cam 94. At the lowermost portion of vertical extension 82 is cam 90 including bearing assembly 92 rotatably connected thereto.

Figure 15:
FIG. 15 is a cross-sectional view taken along line 15—15 of FIG. 13 and viewed in the direction of the arrows.

FIGS. 13 and 15 show sleeve cooperating member 68 having a plurality of keys 136 extending radially therefrom. Keys 136 are received in slots 134 of telescopic sleeve member 66. Extending from the uppermost portion of sleeve cooperating member 68 is vertical extension 70.

OPERATION

Vanes 24 of mechanical sail A may be controlled for movement by two independently manipulated operator means. In order to compensate for changing wind velocity, vanes 24 may be bowed outwardly to varying degrees. This is accomplished by activating second piston operator means 58. As piston rod 64 is extended, plate 56 having first piston operator means 54 connected thereto along with cam follower 52 and second nonrotatable sleeve 48 will move upwardly along a portion of the length of nonrotatable sleeve 10. As second nonrotatable sleeve 48 moves upwardly, so too will bearing assembly 50, bottom vane mount 20 and auxiliary plate 44. Upwardly extending sleeve portion 22 of bottom vane mount 20 will telescopically slide over the surface of downwardly extending sleeve portion 18. Telescopic sleeve members 66 will likewise slide upwardly over the surfaces of sleeve cooperating members 68. Vanes 24 will bow outwardly as bottom vane mount 20 moves upwardly toward top vane mount 14 since vanes are connected to hinged vane supports 28, 26 which are in turn connected to bottom and top vane mounts 20,14 respectively.

Vanes 24 may be rotated so as to alter the pitch thereof by first piston operator means 54 which may be controlled independently of second piston operator means 58. As first piston operator means 54 is activated, cam follower 52 will move upwardly along a portion of the length of second nonrotatable sleeve 48. In order to compensate for the change in vertical positioning of cam follower 52 with respect to second nonrotatable sleeve 48, cams 90 will rotate causing vanes 24 to rotate due to the interaction of cams 94 and 96 as well as cam members 78,80. Changing the pitch of vanes 24 will allow mechanical sail A to operate efficiently under conditions of changing wind direction.

Mechanical sail A has several modes of operation. In one mode, mechanical sail A may be wind driven in order to generate power through drive shaft 2 so as to drive auxiliary apparatus. Mechanical sail A may be mounted in a boat B so as to drive propeller 4 as shown in FIG. 1. If an auxiliary motor 8 is connected to drive shaft 2 through a transmission 6, propeller 4 may be partially or completely driven by auxiliary motor 8 depending on the amount of wind available for driving mechanical sail A.

The auxiliary motor 8 may be connected through appropriate transmission to drive shaft 2 and disconnected through appropriate transmission from propeller 4. In so doing, the rotating power driven sail A will propel the boat B in any desired direction. Neutral position of the vanes 24 would be center position of the bearing assembly 92 on the cam 52. Above or below center position will cause the boat to go forward or rearward as the vanes are angled in a no wind condition.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains, and as may be applied to the essential features hereinbefore set forth and fall within the scope of this invention or the limits of the claims.

What is claimed is:
1. A mechanical sail including:
   (a) a mast including a rotatably drive shaft and a nonrotatable sleeve surrounding said drive shaft,
   (b) a top vane mount and a bottom vane mount rotatably connected to said mast,
   (c) said mounts spaced from each other on said mast,
   (d) a series of rotatable vanes spaced from and surrounding said mast and supported by and between said mounts,
   (e) means extending between said mounts and connected to said vanes for controlling the rotation of said vanes including cam means,
   (f) first piston operator means for said cam means associated with said mast below said bottom vane mount,
   (g) said first piston operator means being movable vertically with respect to said mast,
   (h) second piston operator means for moving said first piston operator means vertically with respect to said mast,
   (i) said vanes being flexible and bowed outwardly,
   (j) said bottom vane mount being movable vertically with respect to said mast and connected to said second piston operator means,
   (k) whereby when said second piston operator means is operated, said bottom vane mount will move toward said top vane mount causing said vanes to bow outwardly at a desired arc, and
   (l) whereby when said first piston operator means is moved, said vanes are caused to rotate to the desired angle of attack with respect to wind velocity and direction.
2. A mechanical sail as in claim 1 and wherein:
   (a) said first piston operator means includes a cam follower, and
   (b) a cam movable on said cam follower.
3. A mechanical sail as in claim 2 and wherein:
   (a) said cam follower includes a conically shaped exterior surface, and
   (b) said cam is spring tensioned on said conically shaped exterior surface.
4. A mechanical sail as in claim 1 and wherein:
   (a) said vanes are shaped as airfoils.

5. A mechanical sail as in claim 1 and wherein:

(a) said mechanical sail is caused to rotate by a motor through a transmission to power a boat.

6. A mechanical sail as in claim 1 and wherein:

(a) said mechanical sail is wind driven and drives a propeller to power a boat.

7. A mechanical sail as in claim 1 and wherein:

(a) said means extending between said mounts and connected to said vanes includes telescopic members.

* * * * *